United States Patent
Smith

[11] 3,804,522
[45] Apr. 16, 1974

[54] SYSTEM FOR REMOTE READING THE ANGULAR POSITION OF A SURFACE BY DETECTING POLARIZED LIGHT REFLECTED THEREFROM

[75] Inventor: Jack T. Smith, Sudbury, Mass.

[73] Assignee: Robert T. Dunn, Bedford, Mass. ; a part interest

[22] Filed: Aug. 18, 1971

[21] Appl. No.: 172,757

[52] U.S. Cl.............. 356/114, 356/150, 350/111, 350/159, 250/225
[51] Int. Cl. ........................................... G01n 21/40
[58] Field of Search...... 350/11, 159, 266; 250/225, 250/231 SE; 356/114, 118, 150, 151, 115, 116, 140

[56] References Cited
UNITED STATES PATENTS

| | | | |
|---|---|---|---|
| 3,427,108 | 2/1969 | Vyce | 356/117 |
| 3,604,811 | 9/1971 | McMenmin | 356/117 |
| 3,584,959 | 6/1971 | Carlo et al. | 356/117 |
| 3,617,761 | 11/1971 | Cooper, Jr. | 250/225 |
| 3,345,907 | 10/1967 | Wade | 356/116 |
| 2,029,170 | 1/1936 | Hull | 356/114 |
| 3,474,255 | 10/1969 | White | 356/114 |
| 2,998,746 | 9/1961 | Gievers | 250/225 |
| 3,177,761 | 4/1965 | Redner | 356/115 |

FOREIGN PATENTS OR APPLICATIONS 1,086,905  8/1960  Germany .............................. 356/114

Primary Examiner—David Schonberg
Assistant Examiner—Paul K. Godwin
Attorney, Agent, or Firm—Robert T. Dunn

[57] ABSTRACT

An instrument has on its face a retroreflector surface and in front of that a light polarizer which is mounted on the instrument output shaft, so that when the face of the instrument is viewed from a distance at an observation location while illuminated by a light at the observation location, the intensity or the polarization angle of the light which reflects from the retroreflector on the face of the instrument is representative of the instrument reading. The intensity represents the instrument reading where the illuminating light is polarized and the polarization angle represents the instrument reading where the illuminating light is not polarized. A wedge shaped non-reflecting element is located on the rotating shaft in order to expand the angular measurements of polarization direction from half to full circular scale. The wedge gives a coarse indication of the polarization direction.

2 Claims, 17 Drawing Figures

PATENTED APR 16 1974 3,804,522

PATENTED APR 16 1974

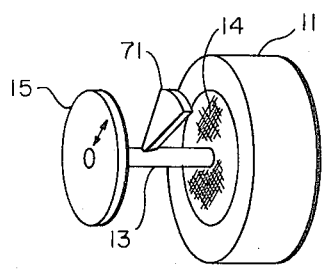
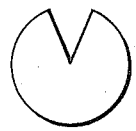
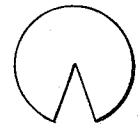
FIG. 10a     FIG. 10b     FIG. 10c
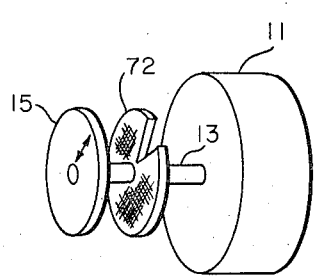
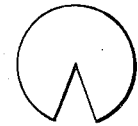
FIG. 11a     FIG. 11b     FIG. 11c

SYSTEM FOR REMOTE READING THE ANGULAR POSITION OF A SURFACE BY DETECTING POLARIZED LIGHT REFLECTED THEREFROM

This invention relates to the subject of remote optical reading of instruments, and more particularly to an instrument having a face thereof specially adapted to enable reading the instrument from a remote point with relatively low optical illumination.

Information represented by highly reflective colors and patterns is read optically with photocell detectors. Colors are distinguished by filters and patterns are distinguished by either moving the detector or moving the pattern, so that the electrical signal output from the detector is a time sequence of pulses which is representative of the pattern. None of these prior techniques are applicable for measuring the static position, such as the static rotational position, of an object by optical observations using a remote stationary radiation detector. It is an object of the present invention to provide apparatus for remotely, optically monitoring the rotation position of an object under relatively low illumination.

Remote reading or indicating instruments are most often used where it is not convenient to observe and read the instrument at the location of the instrument transducer. For example, the transducer may be located in a harmful environment, at a location too remote to be reached with facility or with ease, and so from the standpoint of safety, time, and effort, it is advisable to determine the transducer signal (instrument reading) from a substantially remote location. Where the transducer is located in an explosive environment, it is often inadvisable to transmit the transducer signal by wires or by radio because the transmission system might produce a spark to set off an explosion. Furthermore, either type of transmission requires relatively expensive equipment at the transducer location and this equipment has to be maintained and powered. It is another object of the present invention to provide an optical system for remotely reading an instrument, which avoids the above-mentioned disadvantages of the prior remote reading systems.

It is another object of the present invention to provide an instrument face and portable viewing apparatus for viewing the instrument under relatively low illumination from a light source whereby the instrument is read, even at distances beyond the ordinary capacity of the optics in the apparatus to resolve the numerals and indicators on the face of the instrument.

It is another object to provide such remote optical reading apparatus for determining the rotational position of a shaft in the instrument.

It is another object to provide further apparatus for determining optically at the remote location the reference position to which the angular position of the instrument shaft is related.

Remote readings of points of excessive temperature by simply flashing a light beam to the point from a remote location and getting an instant indication of whether or not the temperature has exceeded a predetermined limit, or is presently exceeding a predetermined limit, would provide a useful tool for many applications. It would facilitate inspecting railroad car bearing boxes, each while the train is in motion at high speed past the point of inspection. It would facilitate inspecting power lines from the roadside, even while driving past or flying over the power lines. It is a further object of an embodiment of the present invention to provide a relatively simple temperature responsive reflector device, which can be quickly inspected even from a moving vehicle and will indicate instantly whether a predetermined temperature limit at the location of the device has been exceeded.

Embodiments of the present invention provide a retroreflector at the location of the transducer or instrument. This retroreflector is illuminated from the remote point of optical observation and the light reflected by the retroreflector is monitored from that point. The parameter under observation causes a variation of the intensity or polarization of the observed light and from this the limits or value of the parameter are determined from remote observation. In the simplest embodiment for determining whether temperature limits have been exceeded, the retroreflector is coated with a material that destroys reflecting qualities. This material melts and runs off the retroreflector when a given temperature is exceeded and so thereafter the retroreflector is highly reflective of the incident light and is observed to be very bright at the remote observing point.

Where the instrument produces a shaft rotation representing a parameter, the instrument face is equipped with a retroreflector and an optical polarizer attached to the shaft. At the remote location, the instrument face is observed while illuminated from the remote location. Where the illuminating light is polarized, the brightness of the instrument face is a measure of the parameter. Where the illuminating light is not polarized, polarization angle of light from the instrument is a measure of the parameter. In the latter case, the instrument is observed through a second optical polarizer which is rotated to produce a peak or a nadir in the intensity of the illuminating light reflected from the face of the instrument. The rotational position of the second polarizer at the peak of nadir is representative of the shaft position of the instrument.

Other features and embodiments of the present invention provide improvements to the above-described embodiments which have further advantage in the practice of the invention.

These as well as the objects of the invention are fully apparent from the following description of the embodiments taken in conjunction with the drawings in which.

Figure 9:
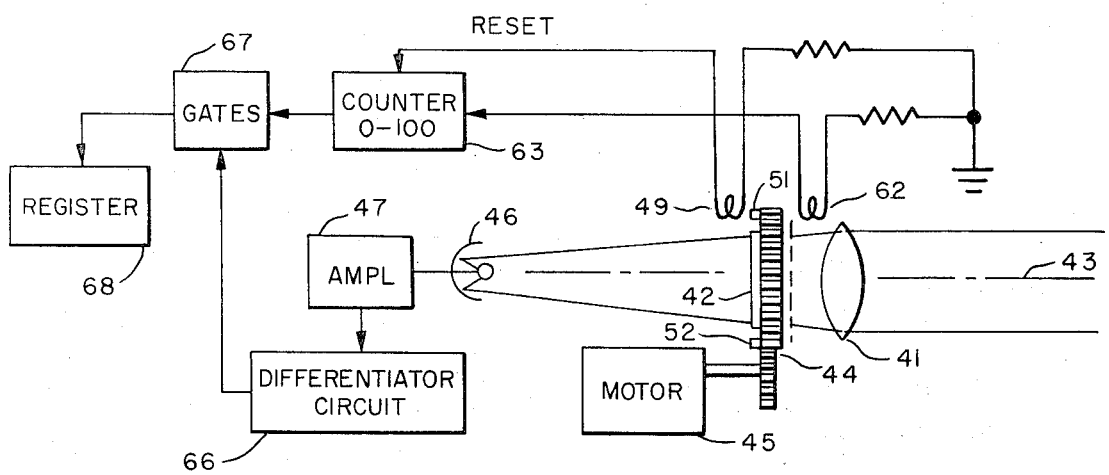

FIG. 9 is a mechanical and electrical schematic of antoher embodiment of the observing apparatus at the remote location for determining the instrument reading; and FIGS. 10a, 10b, and 10c and 11a, 11b, and 11c illustrate two different structures for resolving ambiguity in instrument reading.

Figure 1A:
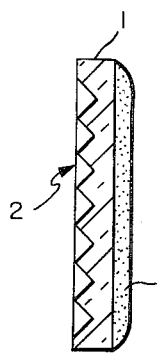
FIGS. 1a to 1b depict the simple structure and operation of a retroreflector detector for indicating that predetermined temperature limits have been exceeded at the location of the retroreflector.
Figure 1B:
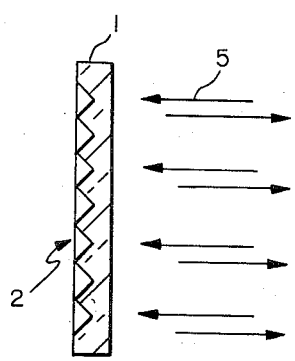

A retroreflector used as a simple indicator of temperature can be observed quickly from a remote location to indicate whether predetermined temperature extremes have been exceeded is illustrated in FIGS. 1a and 1b. These figures show the retroreflector body 1 in cross section with the retroreflector reflecting interface 2 defining an array of corner reflectors. The interface is formed by, for example, molding the corner reflectors in a face of the body which is transparent to the incident light. The opposite surface of the body is coated with an opaque material 4 that melts at the temperature limit to be determined. Before the material melts, the incident radiation 5 is absorbed and scattered by the material 4 and so it is not strongly reflected. When the predetermined temperature is reached and the materail 4 melts, it runs off of the retroreflector body and so the incident radiation is strongly reflected back toward the source, as illustrated in FIG. 1b. Thus, the brightness of the retroreflector to the incident radiation changes many orders of magnitude when the predetermined temperature is exceeded and it remains bright thereafter until again coated with the material 4. The brightness of the retroreflector, as in FIG. 1b, is far greater than the brightness of any surrounding objects and so it is easily observed with the naked eye even at a great distance, and so the condition illustrated in FIG. 1b is readily observed and can be recorded by camera or by eye.

Figure 2A:
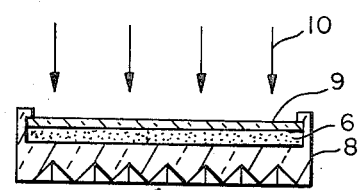
FIGS. 2a and 2b illustrate structure and operation of a similar sort of retroreflector temperature indicator.
Figure 2B:
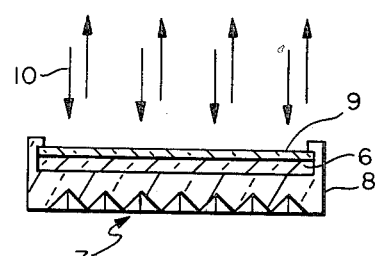

A similar embodiment is illustrated in FIGS. 2a and 2b. Here, a material 6 covers the indicent side of the retroreflector body 8 and is covered by a window 9. The material 6 is such that its transparency is highly temperature dependent. For example, the material 6 may be highly opaque at low temperature and transparent at higher temperature. When it is opaque, the retroreflector appears no brighter than its surrounding an when it is transparent, the retroreflector appears far brighter than its surroundings. Thus, the incident radiation 10 is highly reflected at the higher temperature. Since the material is contained on the retroreflector by the window 9, it need not be replaced after the temperature condition at the retroreflector is exceeded. This indicator, by its reflection, indicates continually the temperature condition at its location.

Retroreflectors are conveniently made, as illustrated in FIGS. 1 to 2, of an array of corner reflectors. A retroreflector may also be made of transparent beads partly immersed in a material that forms a reflective surface at the interface with the beads. A retroreflector of this sort can be substituted for the one shown in FIGS. 1 and 2 and in other embodiments described herein with the same effect.

Figure 3:
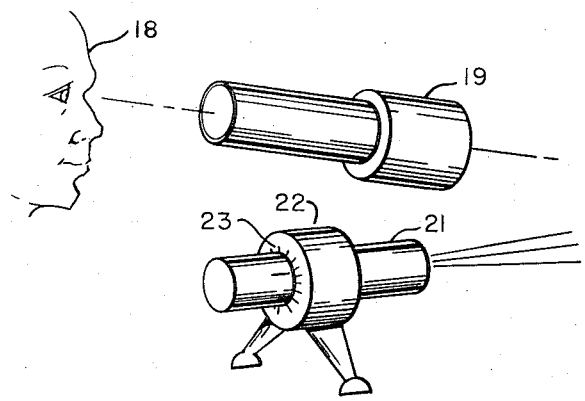
FIG. 3 illustrates an instrument face and apparatus at a remote observing location for determining the rotational position of the indicator of the instrument face when illuminated by polarized light.
Figure 3:
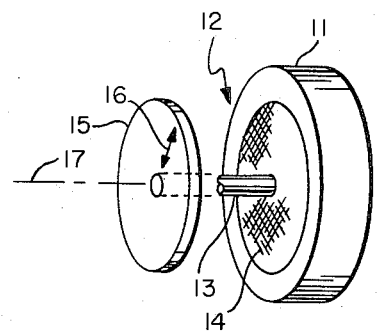

Apparatus for remotely reading an instrument is illustrated in FIG. 3. This includes a detecting instrument illustrated generally by the cylinder 11 and having a face 12, which may be the dial of the instrument, from which the shaft 13 projects. Commonly, an indicator needle or pointer is located on this shaft and points to numbers on the face 12, to indicate the parameter value. Thus, the parameter is represented by the rotational position of the shaft. In accordance with the present invention, the face is at least partially covered with a retroreflector mirror 14. In substantial registration with the retroreflector and attached to the shaft 13 is an optical polarizer 15 illustrated as a disk. As the shaft rotates, the direction of polarization represented by arrow 16 rotates about the shaft axis 17. The direction of polarization is preferably either coincident with the instrument indicator or at right angle to it.

An observer 18 at a remote location observes the instrument face through a telescope 19. A source of polarized radiation 21, which may be a laser, illuminates the instrument face. This source is preferably along side the observer so that he will view the greatest intensity of illuminating light that is reflected by the instrument face. However, neither the observer or the source of light need by aligned with the axis 17 of the instrument.

If the polarization angle of the source is fixed then the observer notes the brightness of the instrument and estimates from that the instrument reading. In this case, brightness varies directly as the rotational position of the polarizer 15 and is greatest where the polarization direction 16 is coincident with the polarization angle of the laser light.

A peak or nadir in brightness is detected more readily by the observer. For this purpose, means are provided for varying the polarization of light from the laser, by, for example, mechanically rotating the laser in a yoke 22. A scale 23 on the yoke indicates the laser polarization angle. In operation, the instrument face will appear brightest (a peak) when the laser polarization direction and polarizer 15 polarization direction are coincident. It will appear least bright (a nadir) when these directions are crossed. Thus, the laser is rotated to produce a peak or nadir in the brightness of the instrument face at which point the laser position on scale 23 represents the instrument reading.

Figure 4:
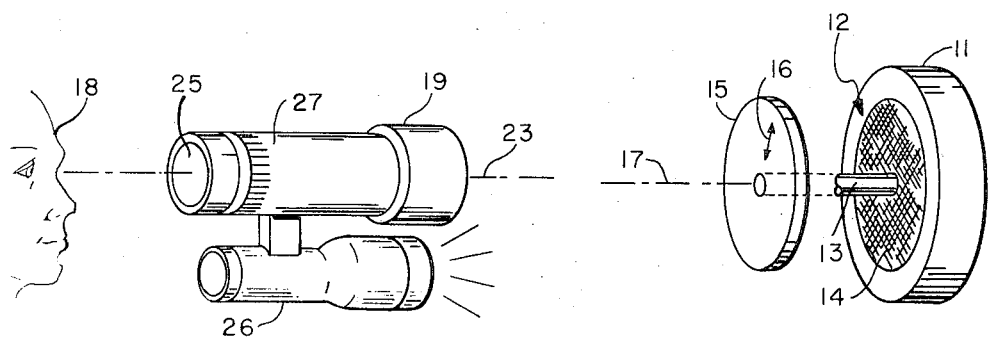
FIG. 4 illustrates an instrument face and apparatus at a remote observing location for determining the rotational position of the indicator on the instrument face when illuminated by non-polarized light.

Another embodiment wherein the instrument is illuminated by nonpolarized light is illustrated in FIG. 4. In this embodiment, the observer 18 at the remote location observes the instrument face through the telescope 19 having a rotatable optical polarizer 25 attached. The source of radiation 26, which may be a flashlight, is located adjacent the telescope so that when the telescope is directed toward the instrument, the instrument is illuminated by light from the flashlight. In operation, the observer rotates the polarizer 25 until the brightness of the instrument face appears to be a maximum or a minimum (peak or nadir). At this point, the rotational position of the polarizer 25 is representative of the instrument reading. If the angle of polarization of the polarizer 15 for maximum transmission of that polarizer is coincident with the instrument reading, thus the angle of polarizaton for maximum transmission of the polarizer 25 when the face of the instrument appears brightest will also be coincident with the reading. The polarizer 25 can also be rotated to produce a minimum brightness of the face of the instrument, indicating that the directions of polarization of the two polarizers 25 and 15 are at right angles and so the meter reading is interpreted accordingly. It is often easier for an observer to null the brightness than to detect a point of peak brightness and the null can be arrived at with more precision than the peak.

Figure 5:
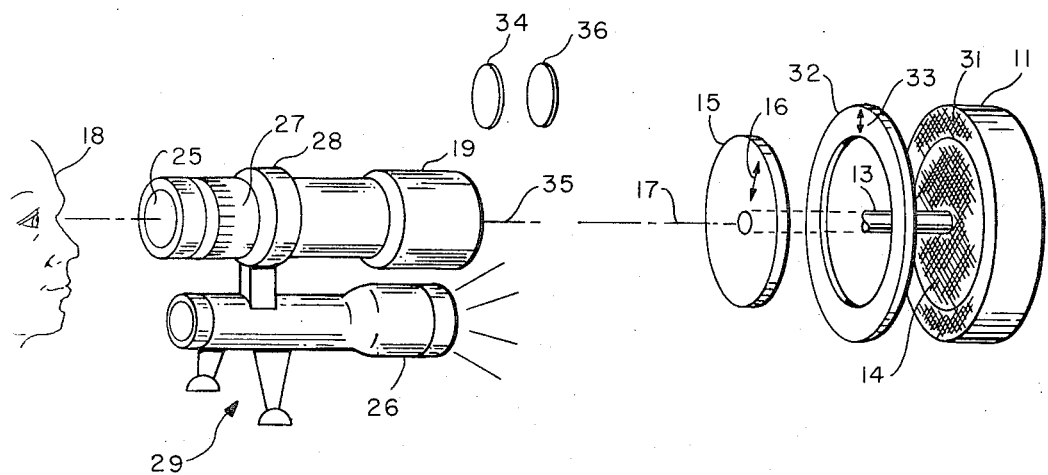
FIG. 5 illustrates apparatus as in FIG. 4 and further including additional structure at the instrument face adn at the remote observing location for aligning the zero or reference position at the observing location to the zero or reference position at the instrument.

With the apparatus illustrated in FIG. 4, the observer determines the rotational position of polarizer 25 relative to the scale 27 on the observing apparatus. Thus, the scale 27 must be at a spatial position which corresponds to the scale on the face of the instrument. The reference for these may be for example, gravity. If the scale on the face of the instrument is precisely oriented with gravity but the scale 27 on the observer's equipment is not, then an error will occur in the observer's reading. The apparatus shown in FIG. 5 includes additional structure for avoiding and eliminating this error. In FIG. 5, the telescope and polarizer housing is rotatable within a yoke 28, attached to a stand 29, that may be fixed in position. The flashlight 26 is also attached to this stand. On the face of the instrument is a second retroreflector surface 31 defining a ring concentric with the retroreflector 14, and a ring-shaped polarizer 32 is located on top of this. The polarizers 15 and 32 are preferably thin sheets, the first being a disc and the other a ring, concentrically located as shown in the figure, and each in registration with a different area of retroreflector on the face of the instrument 11. Between each of these polarizing films and the associated retroreflector surface are located different color filters. This may be accomplished by coating each of the retroreflector surfaces 14 and 31 with different color transparent films. For example, retroreflector surface 14 may be coated with a red transparent layer and surface 31 may be coated with a blue transparent layer. Thus, red light reflected from the face of the instrument is polarized by polarizer 15 and blue light reflected from the face of the instrument is polarized by the polarizer 32. The angle of polarization of polarizer 32 represented by the arrow 33 is fixed relative to the dial on the face of the instrument and is coincident with, for example, the zero reading of the instrument and this emains so whether the instrument is tilted on way or another.

In operation, the observer 18 first inserts the blue filter 34 into the optical path 35 and adjusts the telescope 19 in the yoke 28 to a point where brightness is maximum or minimum, depending upon whether the polarizer 25 is intended to be coincident or crossed to the polarizer 32 on the instrument. At this point, the observer knows that the scale 27 is aligned with the scale on the face of the instrument. Then the blue filter 34 is replaced with the red filter 36 and the observer rotates the polarizer 25 to produce a brightness peak or null, just as earlier described with reference to FIG. 4, to arrive at a reading of the instrument.

Figure 6:
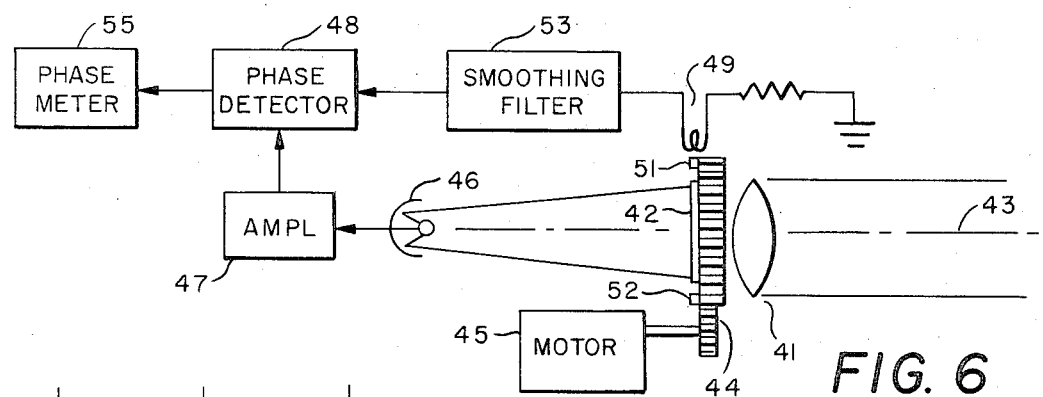
FIG. 6 is a mechanical and electrical schematic illustrating the interrelationship between components in automatic apparatus at the observing location.

The observer's part in the systems illustrated in FIGS. 3, 4, and 5 can be at least partially replaced by apparatus including a motor drive for rotating the laser 21 in FIG. 3 or the polarizer 25 in FIGS. 4 and 5 to determine the instrument reading. The system in FIG. 6 illustrates such apparatus for replacing the observer in FIG. 4. It includes a motor drive which continually rotates the polarizer 25 while the intensity of light passing through this polarizer is detected by a photocell. Thus, the electrical signal from the photocell is cyclic at twice the frequency of rotation of the polarizer 25. The relative phase of the cyclic signal from the photocell to the rotational position of the polarizer 25 is representative of the dial reading of the instrument. FIG. 6 is a very brief schematic of this system. It includes an optical system 41, which represents the telescope, a polarizer 42 (which is the equivalent of polarizer 25 in FIGS. 4 and 5) driven in rotation on the optical axis 43 via the gear mechanism 44 by the motor 45. The light transmitted by the polarizer 42 is focused on the photocell 46 producing an electrical signal in the output of the photocell, which is amplified by amplifier 47 and applied to an input of phase detector circuit 48. This electrical signal is represented by a waveform in FIG. 6 denoted photocell output and is cyclic at twice the frequency of the polarizer 42.

The rotational phase of the polarizer 42 is detected by a magnetic pickup coil 49, in which an electric pulse is produced each time one of the two magnetic spots 51 and 52 at the periphery of the polarizer 52 pass the pickup coil. These spots are located 180° apart around the periphery of the polarizer.

Figure 7:
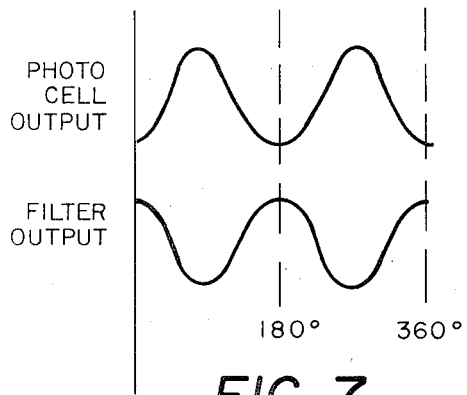
FIG. 7 illustrates the waveforms of electrical signals produced in the output of the photocell and the magnetic pickup, shown in FIG. 6.
Figure 8:
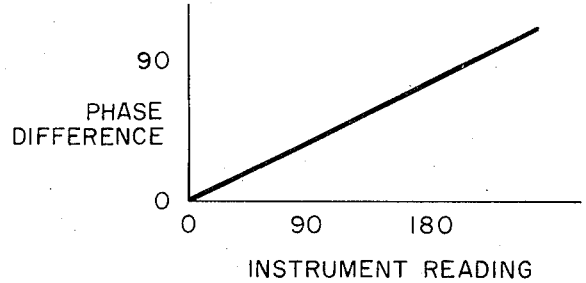
FIG. 8 is a calibration showing the relationship between the electrical phase of the signals at the remote location to the dial reading or shaft position at the instrument in FIG. 6.

The pulses from the pickup coil are smoothed to produce substantially a sine wave of twice the frequency of rotation of the polarizer and the phase of this sine wave is a direct correlation to the angular position of the polarizer. The output of the smoothing filter 53 is represented in FIG. 7 by the waveform denoted filter output. For purposes of reference, the peak excursions of the filter output occur at the zero degree and 180° positions of the polarizer 42. The phase difference between the two waveforms shown in FIG. 7 then represents the angular difference between the polarizer 15 on the face of the instrument and the polarizer 42 at the remote measuring location. Since the rotational position phase of the polarizer 42 is presumed to be the reference, then this phase difference represents the angular position of the instrument shaft 13 and so represents the instrument reading. FIG. 8 shows a calibration plot of the phase difference versus the instrument dial reading. Clearly, the apparatus shown in FIG. 6 is not positioned to a null, but rather is dynamic in operation and so is less limited by the threshold of detection of the photocell than would be a null type system.

Another dynamic system which produces a digital output suitable for feed into a computer is shown in FIG. 9. Here, the optical and mechanical parts may be the same as the optical and mechanical parts in FIG. 6, except that a multitude of magnetic spots 61 are located around the periphery of the polarizer 42 and these are detected by a second magnetic pickup coil 62. The pulses produced in the pickup coil 62, as these spots pass this coil, are fed to counter 63. This counter is cleared by the pulses produced in the pickup counter 49 and so the counter clears at the zero position and at the 180° position of the polarizer 42, between those two positions of the polarizer where the counter counts to some predetermined number which may conveniently be 100. Meanwhile, the photocell 46 produces an output signal such as shown in FIG. 7, which is differentiated by differentiator circuit 66 producing a spike pulse at each peak excursion of the signal from the photocell. This spike pulse controls output gates 67 which feed the output from the counter 63 to register 68. Thus, the register contains a binary number which is representative of the instrument dial reading.

Light polarization is represented by an angular measure between 0° and 180°. Clearly, 360° of polarization is not possible. For this reason, the instrument reading cannot involve more than half of the full circular scale on the face of the instrument, otherwise there would be an ambiguity in the reading. For example, an instrument reading at 90° cannot be distinguished from the instrument reading at 270°. This ambiguity can be resolved by giving the reflected pattern from the instruments face a shape which rotates as the instrument reading changes and points roughly in the direction of the reading. The observer can then determine in which quadrant of the instrument the reading is. Simple techniques for shaping the pattern to reveal the quadrant of reading to the observer are illustrated in FIGS. 10 and 11. In FIG. 10a, a wedge shaped non-reflective piece 71 is mounted on the instrument shaft 13 along with the polarizing disc 15 and oriented on the shaft so that it is aligned with the direction of the indicator on the instrument face. The wedge 71 will alter the reflective image to the observer as illustrated in FIGS. 10b and 10c. These represent the shape of the image when the instrument reading is 0° and 180°, respectively.

Ambiguity is resolved with the structure in FIG. 11 which includes a shaped retroreflector 72 mounted on the instrument shaft 13 along with the polarizing disc 15. The shape of the retroreflector 72 is distinctive and points in the direction of the instrument indicator. Thus, the reflected image at the observation point appears as illustrated in FIGS. 11b and 11c which represents readings at 0° and 180°, respectively. With this structure for resolving ambiguity as well as with the structure illustrated in FIGS. 10a, b, and c, the observer illuminates the face and while observing the illuminated face, rotates the polarizer 25 to produce a peak or a null in the brightness of the face. While doing this, the observer will note that pattern of brightness on the face and so at that time will resolve the ambiguity and make note of this.

Modification and variations of the structures disclosed in the numerous embodiments of the present invention may be made within the state of the art without varying from the spirit and scope of the invention as set forth in the accompanying claims.

What is claimed is:

1. In apparatus for optically monitoring rotation of a rotational part of an indicating device including a source of radiation, a retroreflector on the device, an optical polarizer on the rotational part between the source and retroreflector and means for detecting source radiation reflected from the retroreflector which passes through the optical polarizer to produce a signal representative of the rotational position of said part; means for revealing a coarse representation of the rotational position comprising, means along the optical path between the optical polarizer and the retroreflector, attached to the rotating part of the indicating device for producing a dull area on the retroreflector, the rotational position of said dull area being the coarse representation of the rotational position of said rotating part, the rotational directional of the dull area being evident as viewed remotely.

2. Apparatus as in claim 1 wherein, the retroreflector is attached to the rotating part of the indicating device and a segment of the retroreflector is non-reflective, whereby the rotational position of the segment as viewed remotely is the coarse representation.

* * * * *